J. T. STEELE.
CORN PLANTER.
APPLICATION FILED MAY 2, 1916.

1,223,838.

Patented Apr. 24, 1917.
3 SHEETS—SHEET 3.

WITNESSES

INVENTOR
Joseph T. Steele
BY
ATTORNEY

UNITED STATES PATENT OFFICE.

JOSEPH T. STEELE, OF WINDSOR, ILLINOIS.

CORN-PLANTER.

1,223,838.

Specification of Letters Patent.   Patented Apr. 24, 1917.

Application filed May 2, 1916.   Serial No. 94,925.

*To all whom it may concern:*

Be it known that I, JOSEPH T. STEELE, a citizen of the United States, residing at Windsor, in the county of Shelby and State of Illinois, have invented certain new and useful Improvements in Corn-Planters, of which the following is a specification.

This invention relates to a corn planter, and more particularly to that class of corn planters wherein means are employed for checking the field as the corn is planted.

One object of the present invention is to provide a suitable seed delivery or seed planting mechanism.

Another object resides in providing suitable marking means and check row means.

A further object consists in the provision of a driving gear frame which has flexibly connected therewith a runner frame carrying the seed planting mechanism, means being provided for exerting an upward pressure on the runner frame to insure the proper planting of the corn even though the condition of the ground upon which the device is being operated is extremely rough.

A still further object resides in the provision of means for adjusting the runner frame and seed planting mechanism longitudinally relative to the driving gear frame so that the check row marker and planting mechanism may be selectively actuated and brought into alinement with rows previously planted.

One other object resides in the provision of a novel form of cam wheel for operating the seed planting mechanism.

With the above and other objects in view, I will now proceed to describe a specific embodiment of my invention which I have illustrated in the accompanying drawings forming a part hereof and wherein.

Figure 1:
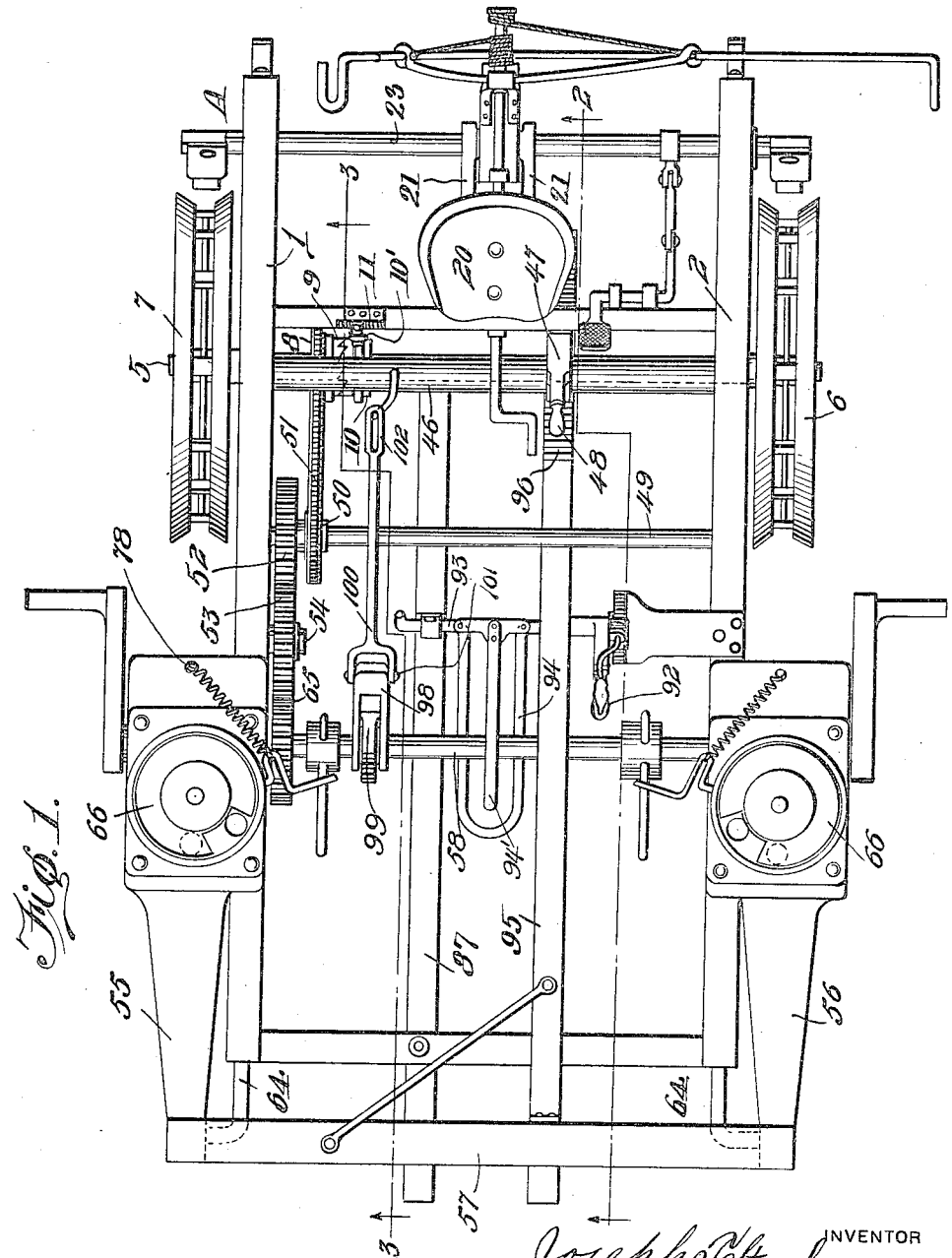
Figure 1 is a top plan view of a corn planter embodying my invention.

The present invention comprises a driving gear frame designated as a whole at A and a runner frame designated as a whole at B. The driving gear frame comprises the two side frame members 1 and 2 each slotted forwardly as shown at 3 for purposes to be hereinafter set forth. The said members 1 and 2 carry journals 4 in which is mounted the axle 5 carrying wheels 6 and 7 which may be of the flat rib type or the open rib type. The axle 5 carries the sprocket 8 having at one side the clutch member 9. The sprocket 8 and its complemental clutch member 9 are loose on the axle 5 whereas a clutch member 10 coöperating with the clutch member 9 to form a driving engagement therebetween is fixed for rotation with the axle 5 but is slidable longitudinal thereof so as to move into and out of driving engagement with the clutch member 9. Such movement is accomplished through the medium of a lever 10' which is pivoted to a quadrant 11 as shown, and may be provided with suitable latch mechanism for holding the lever in its various positions of adjustment. The lever 10' is adapted when moved to engage or disengage its clutch member 10 with the loose clutch member 9, depending upon the direction in which the said lever 10' is moved. Journaled on the axle 5 is a seat post 19 which carries at its upper end the seat 20. This seat is also supported by the angularly disposed members 21 connected with the seat post as shown at 22 and also connected to shaft 23 rearwardly of the said axle 5 and carried by the frame members 1 and 2.

Carried by the frame members 1 and 2 and located substantially above the axle 5, is the transversely extending member 46 which has journaled thereon the gear member 47 provided with the lever 48 and which is for a purpose to be hereinafter set forth.

Forwardly of the transversely extending member 46 and also mounted in the frame members 1 and 2, is a transversely extending shaft 49 which carries the sprocket 50 and a driving chain 51 is passed over the sprockets 50 and 8 so that when the clutch members 9 and 10 are in driving engagement and the planter is being drawn, either by a traction locomotive or draft animals, the shaft 49 is driven. The shaft 49 carries a gear 52 which meshes with a second gear 53 carried on a stub shaft 54 mounted in the frame member 1.

The runner frame comprises the two runners 55 and 56 which are connected across at their forward ends by the transversely extending member 57 and have journaled in their rearward portions the transversely extending shaft 58. The runner frame is flexibly connected to the driving gear frame by means of members 63 which ride in slots 3 of the frame members 1 and 2 of the driving gear frame and also members 64 which ride in said slots. Thus the runner frame is longitudinally movable relative to the driving gear frame. The shaft 58 carries a gear 65 meshing with the gear 53 and therefore when the runner frame is in its normal position as shown in Fig. 1, that is to say, not advanced with respect to the driving gear frame, the gears 52, 53 and 65 all mesh and by reason of the fact that the shaft 49 is driven through the medium of the chain 51, the shaft 58 is also driven. On the upper portion of each runner 55 and 56 is mounted a seed hopper 66 designed to hold a quantity of seeds, and with which may be associated any suitable mechanism operated by the movement of the vehicle for discharging seeds at the proper intervals and in proper quantities.

Figure 2:
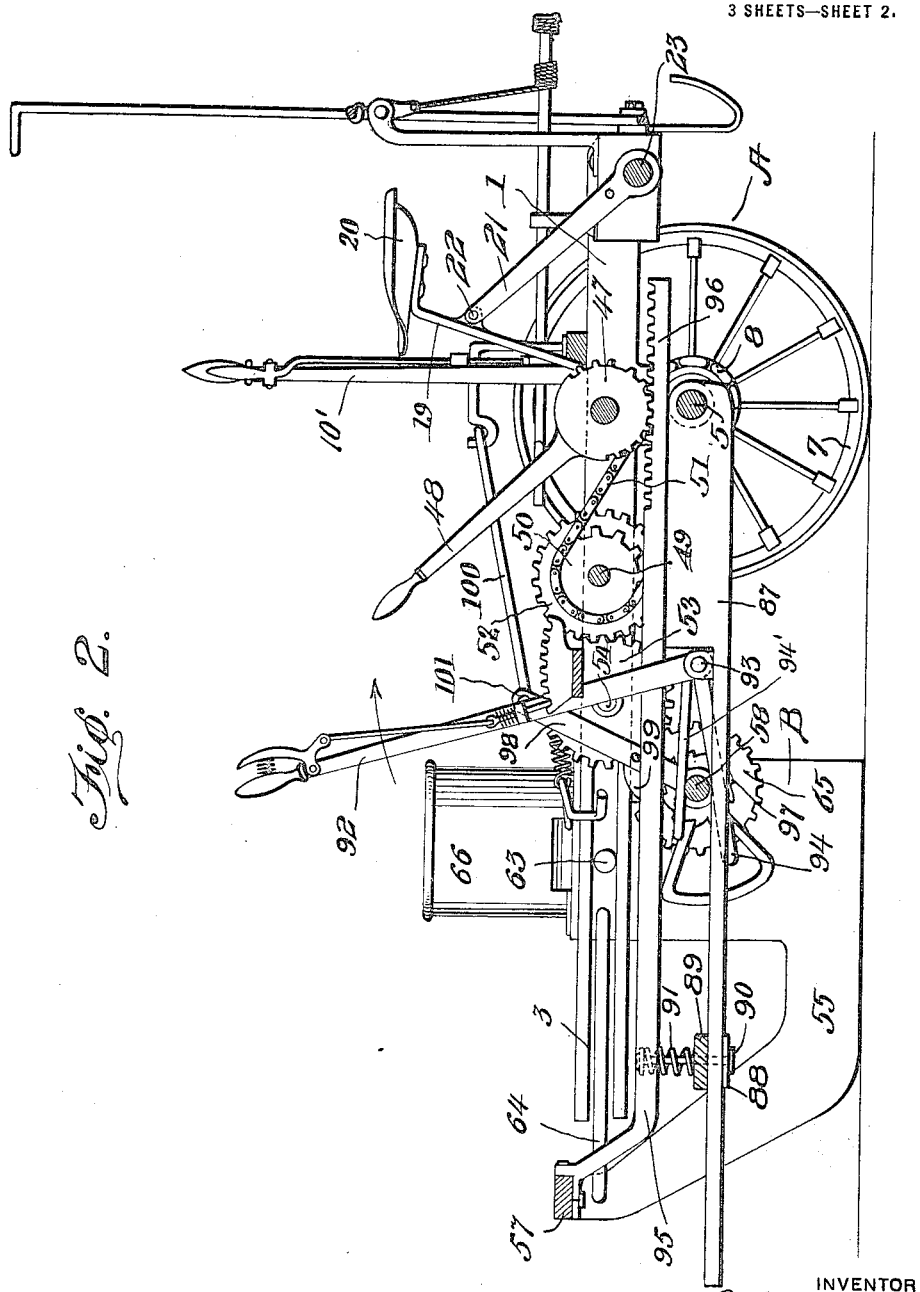
Fig. 2 is a sectional view on the line 2—2 of Fig. 1.
Figure 3:
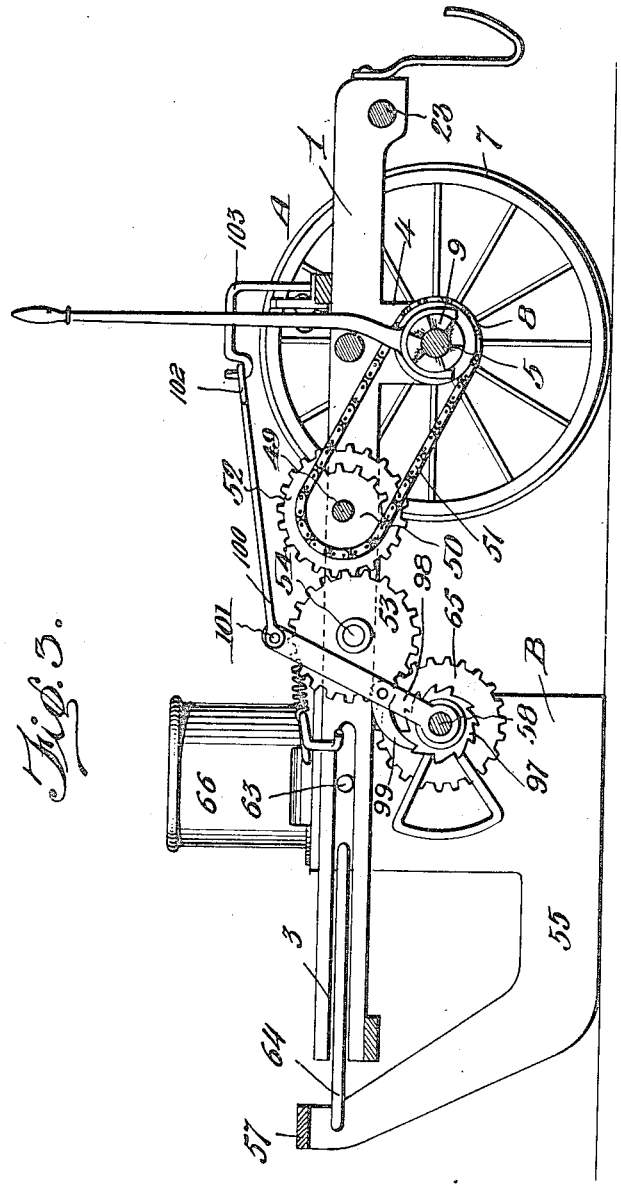
Fig. 3 is a sectional view on the line 3—3 of Fig. 1.

Journaled on the axle 5 are two members 87 which extend forwardly beneath the runner frame and are connected together as shown at 88. Extending across the forward ends of the frame members 1 and 2 is a transverse member 89 through which a bolt 90 connected with the said member 88 passes and this bolt carries a spring 91, the tendency of which is to permit movement of the members 87 relative to the frame members 1 and 2. To the members 87 is attached, at the forward end, a suitable draft tongue. Thus, unevenness in the ground being treated is compensated for by movement of the members 87, rather than by movement of the driving gear frame or runner frame. However, a lever 92 pivoted at 93 carries an arm 94 which, when the said lever is moved in the direction of the arrow in Fig. 2 engages the shaft 58 and exerts an upward pressure on the runner frame, and when moved in the opposite direction the pressure is just the reverse by reason of the arm 94'.

Connected with the forward member 57 which connects the runners 55 and 56 together, is a horizontally extending member 95 which extends beneath the frame members 12 and parallel therewith and at its rear end carries a rack 96 which is engaged by the teeth of the gear member 47 and therefore upon moving the lever 48 the runner frame B may be moved or adjusted longitudinally relative to the driving frame A. However, when the runner frame B is moved in this manner to the extreme forward position it will be found that the gears 65 and 53 are out of mesh and thus the seed planting mechanism will not be actuated by the movement of the vehicle over the ground. The shaft 58 carries a ratchet wheel 97 and journaled on said shaft 58 is a member 98 which carries a pawl 99 engaging said ratchet wheel 97. The member 98 is provided with a lever 100 pivoted thereto at 101 and which is used to actuate the pawl to move said seed planting mechanism when the gears 65 and 53 are disengaged by reason of the runner frame having been longitudinally moved forwardly relative to the driving gear frame. Normally, the lever 100 which, at its rear end, is provided with a loop 102, may be hooked over a member 103.

The advantages of a mechanism constructed in accordance with the foregoing description will be obvious to those familiar with machinery of this character, and as the operations of the various parts have been fully detailed heretofore, additional description of the operation is believed to be unnecessary.

While I have herein described a specific form of the present invention and illustrated the same in the drawings, it is nevertheless to be understood that, in practice, I may resort to such practical modifications as fall within the scope of the invention as defined in the appended claims. And it is also to be understood that, the various parts such as the runners, may be shaped in any suitable manner to obtain the desired effect.

I claim:

1. In a corn planter, a driving gear frame, a runner frame adjustable relative thereto, seed planting mechanism carried by said runner frame, and means for advancing said runner frame relative to said driving gear frame.

2. In a corn planter, a driving gear frame, a runner frame adjustable relative thereto, seed planting mechanism carried by said runner frame, means for advancing said runner frame relative to said driving gear frame, and means for actuating said seed planting mechanism selectively when said runner frame is in the advanced position.

3. In a corn planter, a driving gear frame, a runner frame adjustable longitudinally thereof, and means for exerting upward pressure on said runner frame.

4. In a corn planter, a driving gear frame, a runner frame adjustably and flexibly connected thereto, means for adjusting said runner frame, means for exerting an upward pressure thereon, seed planting mechanism carried by said runner frame, and means for selectively actuating said mechanism.

5. In a corn planter, a driving gear frame, a runner frame adjustable longitudinally with respect thereto, and seed planting mechanism carried by said runner frame.

6 In a corn planter, a driving gear frame, a runner frame movable longitudinally relative thereto, seed planting mechanism carried by said runner frame, and means for advancing said runner frame in a longitudinal direction relative to said driving gear frame.

7. In a corn planter, a driving gear frame, a runner frame movable longitudinally relative thereto, seed planting mechanism carried by said runner frame, means for advancing said runner frame longitudinally relative to said driving gear frame, and means for actuating said seed planting mechanism selectively when said runner frame is in the advanced position.

8. In a corn planter, a driving gear frame, a runner frame movable longitudinally relative thereto, seed planting mechanism carried by said runner frame, means for advancing said runner frame longitudinally relative to said driving gear frame, and means for selectively actuating said seed planting mechanism when said runner frame is in the advanced position and continuously actuating the same when said runner frame is in the normal position.

9. In a corn planter, a driving gear frame, a runner frame longitudinally movable relative thereto, means for exerting an upward pressure on said runner frame, seed planting mechanism carried by said runner frame, means for longitudinally advancing said runner frame relative to said driving gear frame, and means for actuating said seed planting mechanism selectively when said runner frame is in the advanced position and continuously actuating the same when said runner frame is in the normal position.

10. In a corn planter, a driving gear frame, a runner frame longitudinally movable relative thereto, means for exerting an upward pressure on said runner frame, seed planting mechanism carried by said runner frame, means for longitudinally advancing said runner frame relative to said driving gear frame, and means for selectively actuating said seed planting mechanism when said runner frame is in the advanced position.

11. In a corn planter, a driving gear frame, a runner frame flexibly connected therewith and longitudinally movable thereon, means for exerting an upward pressure on said runner frame, seed planting mechanism carried by said runner frame, means for advancing said runner frame relative to said driving gear frame, and means for selectively actuating said seed planter mechanism when said runner frame is in the advanced position and continuously actuating said mechanism when said runner frame is in the normal position.

In testimony whereof I affix my signature in presence of two witnesses.

JOSEPH T. STEELE.

Witnesses:
W. A. STEELE,
W. J. ELZY.

Copies of this patent may be obtained for five cents each, by addressing the "Commissioner of Patents, Washington, D. C."